(Model.)

M. J. DORSETT.
Fruit Driers.

No. 232,697. Patented Sept. 28, 1880.

WITNESSES:
A. Schehl.
C. Sedgwick

INVENTOR:
M. J. Dorsett
BY Munn & Co
ATTORNEYS.

UNITED STATES PATENT OFFICE.

MARTHA J. DORSETT, OF PRINCE GEORGE'S COUNTY, MARYLAND.

FRUIT-DRIER.

SPECIFICATION forming part of Letters Patent No. 232,697, dated September 28, 1880.

Application filed June 19, 1880. (Model.)

*To all whom it may concern:*

Be it known that I, MARTHA JANE DORSETT, of Prince George's county, Maryland, have invented a new and useful Improvement in Fruit-Driers, of which the following is a specification.

Figure 1:
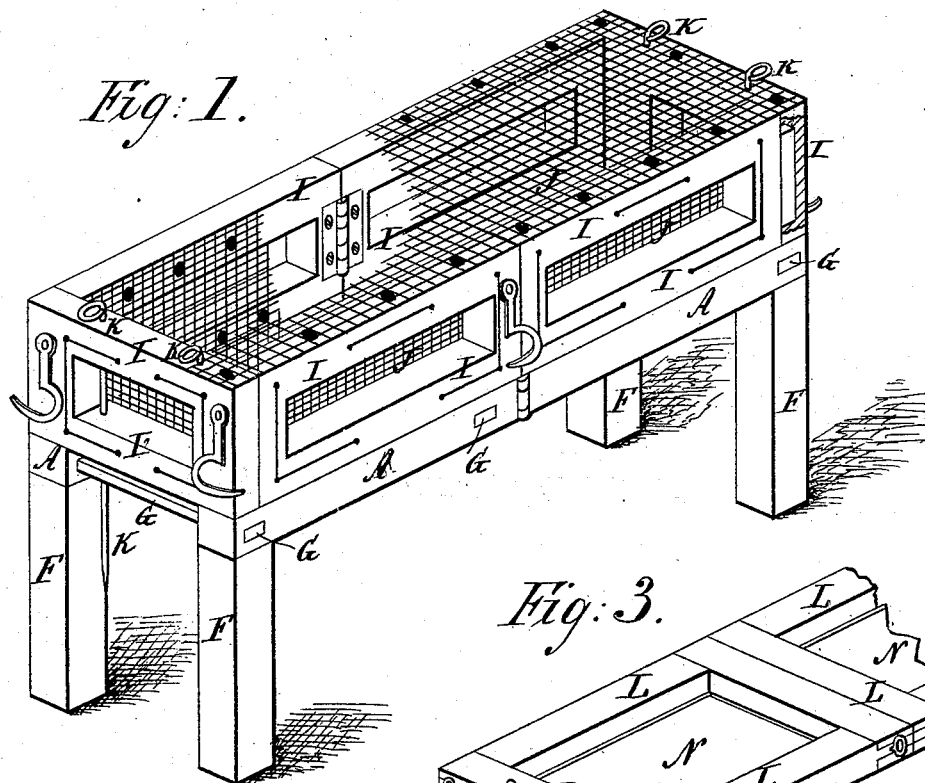
Figure 2:
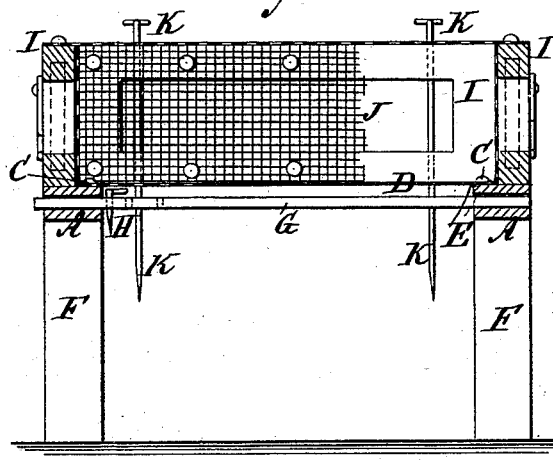
Figure 3:
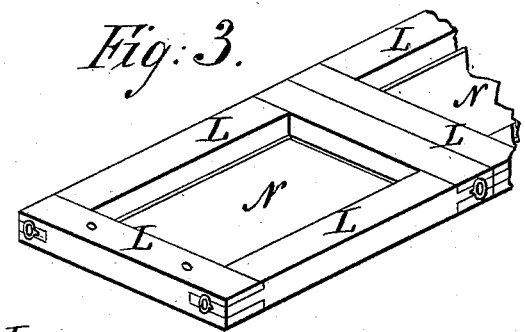
Figure 4:
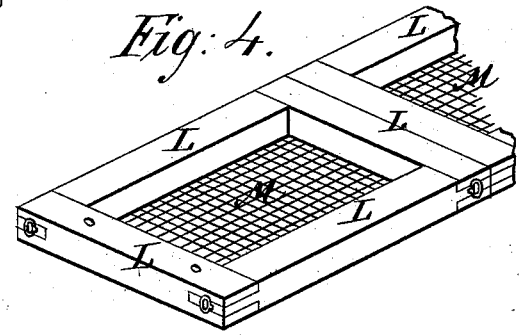
Figure 5:
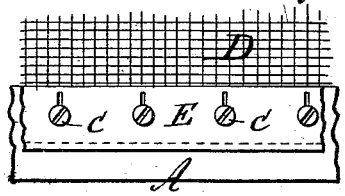

Figure 1 is a perspective view of the improvement. Fig. 2 is a sectional end elevation. Fig. 3 is a perspective view of a detachable glass top. Fig. 4 is a perspective view of a detachable wire-gauze top. Fig. 5 is a plan view of a part of the drier, showing the attachment of the gauze bottom.

Similar letters of reference indicate corresponding parts.

The object of this invention is to furnish fruit-driers so constructed that they can be readily moved from place to place, will protect the fruit from insects, and may be compactly folded for storage and transportation.

A are two side bars, to the upper sides of which are attached screws or headed pins C. The bottom of the drier, as shown in Figs. 2 and 5 of the drawings, is formed of gauze or fine netting D, which has a cloth binding or narrow border, E, attached to its edges, and provided with button-holes to receive the screws or pins C, so that the gauze or netting D can be readily attached to and detached from the said side bars, A, to be washed, replaced by a new bottom, or laid away when not required for use. The side bars, A, may be provided with legs F, to support the drier; or when in use the drier may be placed upon a temporary support formed by laying poles upon forked stakes driven into the ground, or in any other convenient manner. With this construction, when the fruit to be dried is laid upon the bottom D the said bottom will stretch and sag, and requires to be tightened. This is done by the cross-bars G, which are secured at one end in mortises in one of the side bars, A, and their other ends pass loosely through mortises in the other side bar, A, and have a number of holes formed through them to receive pins H, which are inserted in the said holes and rest against the inner side of the said side bar, A, so that the netting D can be drawn taut by spreading the side bars, A, and inserting the pins H in other holes in the said cross-bars.

The side bars, A, are each made in two parts, hinged to each other at their adjacent ends, as shown in Fig. 1, so that the said side bars can be folded together to allow them to be packed in small compass for storage and transportation.

I is a frame or box made with open top, bottom, sides, and ends, and has the openings at its sides and ends closed with netting or wire-gauze J, attached to it, as shown in Figs. 1 and 2.

The cover L is designed to be placed upon the frame I, and is secured to it by pins K, passed through holes in the end bars of the frame I and the cross-bars G of the drier.

The side bars of the frame I have tenons formed upon their ends to fit into mortises in the end parts of the end bars of the said frame, so that the frame I can be readily taken apart. The side bars of the cover-frame I are made in two parts, hinged to each other at their adjacent ends, so that the said side bars, when the frame has been taken apart, can be folded together to allow the said frame to be packed compactly for storage or transportation.

The cover-frame is provided with a top formed of a frame, L, as shown in Figs. 3 and 4, having wire-gauze M attached to it, as shown in Fig. 4, or glass plates N, as shown in Fig. 3, so that either a wire-gauze top or a glass top can be used, as circumstances may require.

In using my fruit-drier the top is removed and the sliced fruit is placed in a single layer on the bottom net, when the cover is replaced.

I have shown how the gauze covering may be used either on the lid or the upper part of box, as may be preferred, and about the sides I have shown both wire and net, to indicate that either may be employed.

The fruit is placed within the box I, upon the bottom of frame A G, and covered with the lid L, having gauze over the fruit, so that the air can freely circulate through the drier and the fruit.

What I claim as new is—

1. A fruit-drier consisting of the frame A

G, having gauze-covered bottom, the frame I, having gauze-covered sides, and the gauze-covered lid L, all said parts being detachably connected, as shown and described.

2. In a fruit-drier, the combination, with the fruit-receiver formed of the side bars, A, having gauze bottom D attached to them, of the extension cross-bars G and the fastening-pins H, substantially as herein shown and described, whereby the slack of the gauze bottom can be taken up, as set forth.

MARTHA JANE DORSETT.

Witnesses:
GEORGE JACOBI, Jr.,
MARY JACOBI.